United States Patent
Yanagida (10) Patent No.: US 9,708,970 B2
(45) Date of Patent: Jul. 18, 2017

(54) HOUSING FOR TURBOCHARGER

(71) Applicant: DENSO CORPORATION, Kariya, Aichi-pref. (JP)

(72) Inventor: Etsugo Yanagida, Chiryu (JP)

(73) Assignee: DENSO CORPORATION, Kariya (JP)

( * ) Notice: Subject to any disclaimer, the term of this patent is extended or adjusted under 35 U.S.C. 154(b) by 401 days.

(21) Appl. No.: 14/508,089

(22) Filed: Oct. 7, 2014

(65) Prior Publication Data
US 2015/0104300 A1    Apr. 16, 2015

(30) Foreign Application Priority Data

Oct. 11, 2013    (JP) ................... 2013-214166

(51) Int. Cl.
*F02C 6/12*    (2006.01)
*F02B 37/02*    (2006.01)
(Continued)

(52) U.S. Cl.
CPC .......... *F02B 37/025* (2013.01); *F01D 9/026* (2013.01); *F01D 25/24* (2013.01); *F02B 37/22* (2013.01); *F02C 6/12* (2013.01); *F04D 27/009* (2013.01); *F05D 2220/40* (2013.01); *Y02T 10/144* (2013.01)

(58) Field of Classification Search
CPC .......... F02B 37/025; F02B 37/22; F02C 6/12; F05D 2220/40; F05D 2230/60; F05D 2230/64; F01D 25/24; F01D 17/105; F01D 17/143; F01D 17/141; F01D 9/026;
(Continued)

(56) References Cited

U.S. PATENT DOCUMENTS 9,151,218 B2 *    10/2015    Ebisu ................ F02B 37/025
2006/0081213 A1 *    4/2006    Yang ................ F01L 1/181
                                                            123/321
(Continued)

FOREIGN PATENT DOCUMENTS

JP    2006-291782    10/2006
JP    2013-245562    12/2013

OTHER PUBLICATIONS

Office Action (3 pages) dated Nov. 10, 2015, issued in corresponding Japanese Application No. 2013-214166 and English Translation (3 pages).

*Primary Examiner* — Craig Kim
*Assistant Examiner* — Eldon Brockman
(74) *Attorney, Agent, or Firm* — Nixon & Vanderhye PC (57)    ABSTRACT

A turbocharger for an engine includes a compressor impeller, a turbine wheel, a turbine housing, a cover, and a flow passage switching valve. The impeller is for compression of intake air. The wheel drives the impeller. The housing includes first and second exhaust scrolls independently of each other, and a flow passage switching hole. The first and second exhaust scrolls swirl exhaust gas which is discharged from the engine and blow the swirled exhaust gas toward the wheel. The hole guides exhaust gas into the second exhaust scroll. The cover is provided separately from the housing. The valve opens or closes the hole, and includes a movable part having a rotatable shaft and a valving element. The movable part is attached to the cover. The cover is press-fitted to the housing, so that the valve is attached to the turbocharger.

7 Claims, 5 Drawing Sheets

(51) Int. Cl.
*F01D 9/02* (2006.01)
*F01D 25/24* (2006.01)
*F04D 27/00* (2006.01)
*F02B 37/22* (2006.01)

(58) Field of Classification Search
CPC ............... F04D 29/4206; F04D 29/462; F04D 27/0207; F04D 27/009
See application file for complete search history.

(56) References Cited

U.S. PATENT DOCUMENTS

| | | | |
|---|---|---|---|
| 2009/0014674 A1* | 1/2009 | Grissom | F01D 17/145 251/298 |
| 2010/0018204 A1* | 1/2010 | McEwen | F02B 37/013 60/600 |
| 2012/0060494 A1 | 3/2012 | Sato et al. | |
| 2013/0149114 A1 | 6/2013 | Kohler | |

* cited by examiner

HOUSING FOR TURBOCHARGER

CROSS REFERENCE TO RELATED APPLICATION

This application is based on Japanese Patent Application No. 2013-214166 filed on Oct. 11, 2013, the disclosure of which is incorporated herein by reference.

TECHNICAL FIELD

The present disclosure relates generally to a turbocharger having first and second exhaust scrolls (whirl passage for blowing exhaust gas into a turbine wheel). In particular, the present disclosure relates to a technique to attach a flow passage switching valve that opens or closes a flow passage switching hole for guiding exhaust gas into the second exhaust scroll.

BACKGROUND

Conventionally, there is known a turbocharger including first and second exhaust scrolls independent of each other. The turbocharger is provided to change a supply of exhaust gas to the second exhaust scroll according to the amount of exhaust gas per unit time discharged from an engine.

Specifically, a flow passage switching hole for guiding exhaust gas into the second exhaust scroll is opened or closed by a flow passage switching valve. (i) A small volume (small flow rate at which to blow exhaust gas into a turbine wheel from the first exhaust scroll) is achieved by the flow passage switching valve closing the flow passage switching hole. (ii) A large volume (large flow rate at which to blow exhaust gas into the turbine wheel from both the first and second exhaust scroll) is achieved by the flow passage switching valve opening the flow passage switching hole (see, e.g., JP-A-2006-291782).

There are the following issues about the conventional technology. The flow passage switching valve opens or closes the flow passage switching hole, which is formed inside a turbine housing, by its valving element. The valving element, which opens or closes the flow passage switching hole, is attached to "inside of the turbine housing" at "a position away from an exhaust inlet of the turbine housing (connecting port of an exhaust manifold)". Accordingly, attachment of the flow passage switching valve deteriorates, thereby increasing the costs.

Specifically, a procedure for the attachment of the valving element in the conventional technology is described below. First, a rotatable shaft for rotating the valving element is inserted into the turbine housing. Next, with the rotatable shaft remaining inserted in the turbine housing, a part of a "crimping device" or a "welding device" is inserted through an opening provided for the turbine housing. The valving element is attached to the end of the rotatable shaft (end of a valve arm) by crimping or welding. Such an attachment operation is low in working efficiency, which is a hindrance to productivity. In addition, the opening through which the part of the "crimping device" or the "welding device" is inserted is closed by a cover after crimping or after welding. The cover is fixed to the turbine housing by bolts.

Figure 7:
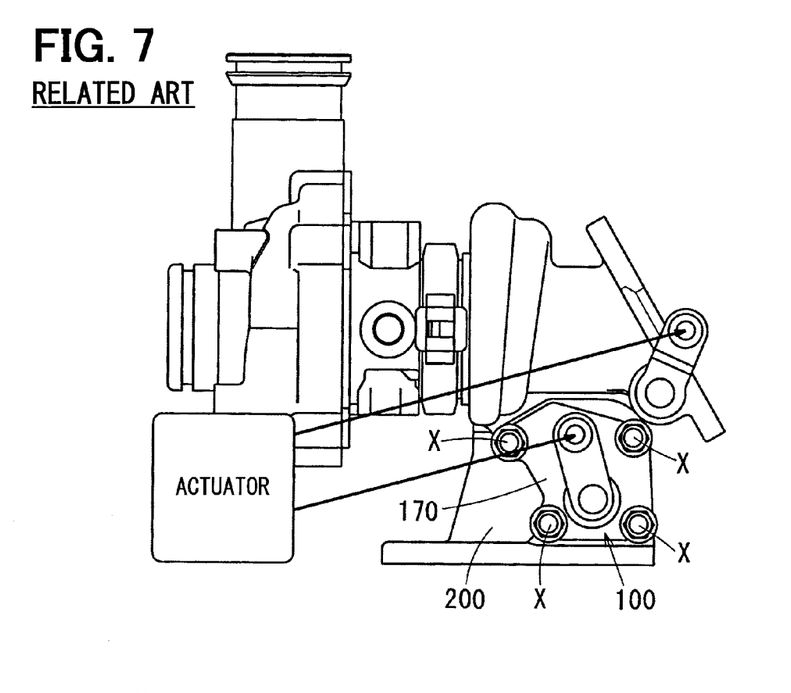
FIG. 7 is an external view of a turbocharger for illustrating a proposed technique.
Figure 8:
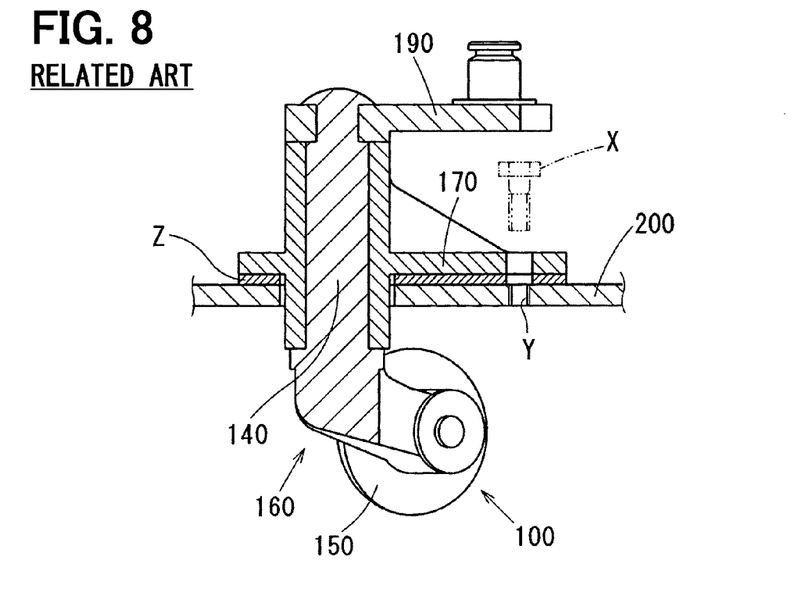
FIG. 8 is a sectional view of a movable part of a flow passage switching valve attached to a turbine housing via a cover for illustrating the proposed technique.

There is proposed a technique below to address the above-described issues. As illustrated in FIGS. 7 and 8, a movable part 160 of a flow passage switching valve 100 including a rotatable shaft 140, a valving element 150, and a lever 190 is attached beforehand to a cover 170 which is a separate member from a turbine housing 200. The cover 170 is fixed to the turbine housing 200 by way of bolts X. Accordingly, the flow passage switching valve 100 is attached to a turbocharger (which is not a known technique).

However, the proposed technique (technique to provide the movable part 160 for the cover 170 in advance) is for fixing the cover 170 to the turbine housing 200 using bolts X. (i) The use of the bolts X causes the increased number of components and increased attachment man-hours. (ii) There is produced a processing cost for forming internal threads Y or the like at the turbine housing 200. (iii) There is needed a space for forming the internal threads Y at the turbine housing 200, thereby hindering the turbine housing 200 from being downsized. (iv) Because the cover 170 is fixed to the turbine housing 200 by use of the bolt X, there is caused an attachment tolerance of the cover 170 with respect to the turbine housing 200. Accordingly, there are increased attachment tolerances of the rotatable shaft 140 and the valve with respect to a flow passage switching hole. In addition, a positioning pin may be added as a means for improving the attachment tolerance of the cover 170 with respect to the turbine housing 200. Nevertheless, there are issues of the increased number of components and increased processing cost.

The proposed technique (technique to provide the movable part 160 for the cover 170 in advance) is for sealing a clearance between the turbine housing 200 and the cover 170 with a gasket Z. When the gasket Z is employed, there is required for the gasket Z such performance that seals high-temperature exhaust gas for a long period of time and that absorbs heat deformation of a gasket sealing surface due to high temperature. Accordingly, a material of the gasket Z becomes expensive, so that there is an issue of increased cost for implementing the proposed technique.

SUMMARY

The present disclosure addresses at least one of the above issues. Thus, it is an objective of the present disclosure to provide a turbocharger that is excellent in attachment of a flow passage switching valve, and excellent in accuracy of attachment of the flow passage switching valve, and that can realize low costs.

To achieve the objective of the present disclosure, there is provided a turbocharger for an engine, including a compressor impeller, a turbine wheel, a turbine housing, a cover, and a flow passage switching valve. The compressor impeller is for compression of intake air. The turbine wheel drives the compressor impeller. The turbine housing includes first and second exhaust scrolls independently of each other, and a flow passage switching hole. The first and second exhaust scrolls swirl exhaust gas which is discharged from the engine and blow the swirled exhaust gas toward the turbine wheel. The flow passage switching hole guides exhaust gas into the second exhaust scroll. The cover is provided separately from the turbine housing. The flow passage switching valve opens or closes the flow passage switching hole, and includes a movable part having a rotatable shaft and a valving element. The movable part is attached to the cover. The cover is press-fitted to the turbine housing, so that the flow passage switching valve is attached to the turbocharger.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described in detail below with reference to the accompanying drawings.

The following embodiments only illustrate the specific examples, and needless to say, the present disclosure is not limited to the embodiments.

First Embodiment

A first embodiment will be described in reference to FIGS. 1 to 4. A turbocharger is disposed in an engine for vehicle traveling (internal combustion engine that produces rotative power by combustion of fuel: all types of engines including a gasoline engine, a diesel engine, a reciprocating engine, and a rotary engine).

Figure 1:
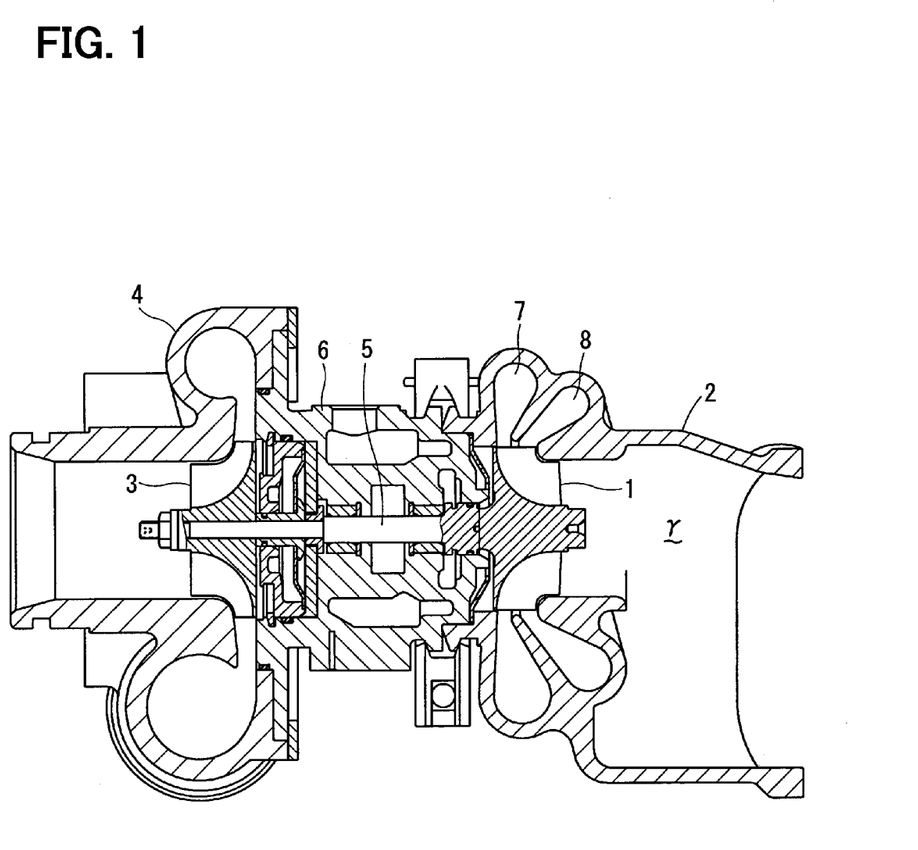
FIG. 1 is a sectional view illustrating a turbocharger in accordance with a first embodiment.

The turbocharger is a supercharger that pressurizes intake air drawn into the engine by energy of exhaust gas discharged from the engine, and includes a turbine wheel 1 that is rotated by exhaust gas discharged from the engine, a swirly turbine housing 2 that accommodates the turbine wheel 1, a compressor impeller 3 that is driven by rotating force of the turbine wheel 1 to pressurize the intake air, a swirly compressor housing 4 that accommodates the compressor impeller 3, a shaft 5 that transmits the rotation of the turbine wheel 1 to the compressor impeller 3, and a center housing 6 that high-speed rotatably supports the shaft 5.

The turbocharger is configured by joining together the turbine housing 2, the compressor housing 4, and the center housing 6 in an axial direction by joining means such as a V-band (retaining ring), a snap ring, and a bolt. First and second exhaust scrolls 7, 8 for blowing exhaust gas toward the turbine wheel 1 are provided in the turbine housing 2 independently of each other.

The first exhaust scroll 7 includes an annular exhaust outlet which swirls the exhaust gas discharged from the engine and through which the swirled exhaust gas is blown toward an upstream part of the turbine wheel 1 in an exhaust gas flow direction (side closer to the center housing 6). The second exhaust scroll 8 includes an annular exhaust outlet which swirls the exhaust gas discharged from the engine (specifically, a part of exhaust gas guided to the first exhaust scroll 7) in the same direction as the first exhaust scroll 7 and through which the swirled exhaust gas is blown toward a halfway part of the turbine wheel 1 (part adjacent to the exhaust outlet of the first exhaust scroll 7).

An upstream part of the first exhaust scroll 7 in the exhaust gas flow direction constantly communicates with an exhaust inlet of the turbine housing 2 (port connected to an exhaust manifold), and the exhaust gas is constantly supplied to the first exhaust scroll 7. On the other hand, an upstream part of the second exhaust scroll 8 in the exhaust gas flow direction communicates with the inside of the first exhaust scroll 7 through a flow passage switching hole 9 formed in the turbine housing 2. The flow passage switching hole 9 is opened or closed by a flow passage switching valve 10.

Figure 2:
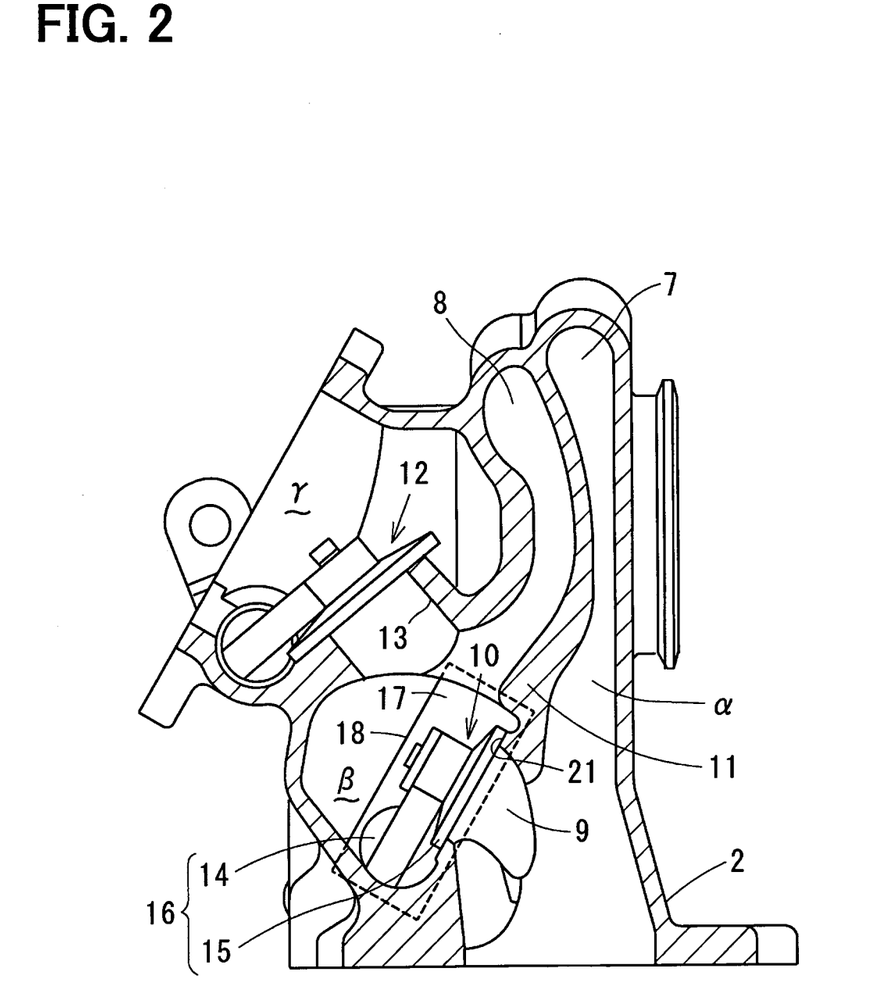
FIG. 2 is a sectional view illustrating a turbine housing including a flow passage switching valve and a waste gate valve according to the first embodiment.

Specifically, as illustrated in FIG. 2, the turbine housing 2 includes a partition wall 11 that divides the first exhaust scroll 7 from the second exhaust scroll 8. A reduced part α of an exhaust passage is defined by the partition wall 11 on an upstream side of the first exhaust scroll 7 in the exhaust gas flow direction. The flow passage switching hole 9 is provided at the partition wall 11 on an upstream side of the reduced part α in the exhaust gas flow direction, and opens in a range in which a passage sectional area in the first exhaust scroll 7 is large.

The flow passage switching valve 10 rotates in a rotation space β that is formed in the turbine housing 2, and opens or closes the flow passage switching hole 9 and adjusts its opening degree, to control the amount of exhaust gas supplied to the second exhaust scroll 8. Specifically, (i) a small volume (small flow rate at which to blow exhaust gas to the turbine wheel 1 from the first exhaust scroll 7) is achieved by the flow passage switching valve 10 closing the flow passage switching hole 9; and (ii) a large volume (large flow rate at which to blow exhaust gas to the turbine wheel 1 from both the first and second exhaust scrolls 7, 8) is achieved by the flow passage switching valve 10 opening the flow passage switching hole 9.

The turbine housing 2 includes a waste gate valve 12 that guides the exhaust gas on an upstream side of the turbine wheel 1 in the exhaust gas flow direction (specifically, on an upstream side of the reduced part α in the exhaust gas flow direction) into a turbine downstream area γ, bypassing the turbine wheel 1. The waste gate valve 12 of the first embodiment opens or closes a bypass hole 13 for bypassing the exhaust gas, which is supplied at least into the second exhaust scroll 8, to the turbine downstream area γ. An upstream end of the bypass hole 13 in the exhaust gas flow direction opens into the above-described rotation space β. Thus, the upstream end of the bypass hole 13 in the exhaust gas flow direction opens in a range in which a passage sectional area in the second exhaust scroll 8 is large.

The operation of the waste gate valve 12 is described below. (iii) The waste gate valve 12 is opened in the case of the excessive amount of exhaust gas per unit time discharged from the engine, for example, at the time of engine high rotation, and a part of exhaust gas on the upstream side of the turbine wheel 1 in the exhaust gas flow direction is bypassed into the turbine downstream area γ. Accordingly, the pressure of exhaust gas supplied to the turbine wheel 1 can be prevented from excessively rising to improve turbine efficiency.

Operations (open and closed states) of the flow passage switching valve 10 and the waste gate valve 12 are controlled by a control device (ECU) through an actuator. The control device calculates a target air amount based on an engine operational state (e.g., engine rotation speed, accelerator opening degree), and calculates a target supercharging pressure from the calculated target intake air amount. Based on a relationship between the calculated target supercharging pressure and the engine rotation speed or the like, the control device calculates an opening degree of the flow passage switching valve 10 and controls the flow passage switching valve 10 to reach a target opening degree.

The control device controls the waste gate valve 12 such that the intake pressure pressurized by the compressor impeller 3 (pressure detected by a supercharging pressure sensor) does not exceed a predetermined pressure. Or, the control device controls the waste gate valve 12 such that the exhaust pressure on the upstream side of the turbine wheel 1 in the exhaust gas flow direction (pressure detected by a turbine exhaust pressure sensor or pressure obtained through calculation) does not exceed a predetermined pressure. In addition, the control device gives priority to the control of an opening degree of the waste gate valve 12 over that of the flow passage switching valve 10.

The flow passage switching valve 10 will be described with reference to FIGS. 3 and 4. As described above, the flow passage switching valve 10 switches between the supply of exhaust gas into the second exhaust scroll 8 and its stop by opening or closing the flow passage switching hole 9 formed in the turbine housing 2. The flow passage switching valve 10 includes a rotatable shaft 14 that is rotated by the actuator, and a valving element 15 that rotates integrally with the rotatable shaft 14 to open or close the flow passage switching hole 9.

Figure 3:
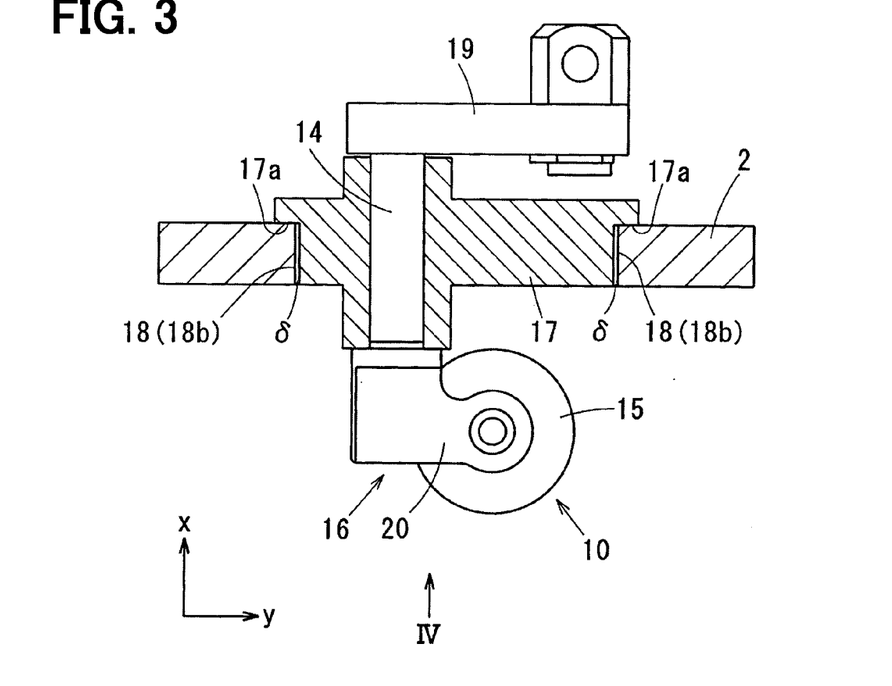
FIG. 3 is a diagram illustrating a movable part of the flow passage switching valve attached to the turbine housing via a cover according to the first embodiment.

A movable part 16 of the flow passage switching valve 10 including the rotatable shaft 14, the valving element 15, and a lever 19 is attached to a cover 17 which is provided separately from the turbine housing 2 as illustrated in FIG. 3. An opening 18 which is closed by the cover 17 is provided for the turbine housing 2. The cover 17, to which the movable part 16 of the flow passage switching valve 10 is attached, is press-fitted into the opening 18 of the turbine housing 2, so that the flow passage switching valve 10 is attached to the turbocharger. In addition, the press-fitting may include "burnt inlay (shrink fit)".

The above will be described in detail. The rotatable shaft 14 is rotatably supported by an inner peripheral surface of a cylindrical bearing part provided for the cover 17, and is rotated by the actuator through the lever 19 and a rod which are attached outside the turbine housing 2. The lever 19 is fixed to the outside of the rotatable shaft 14 (outside the turbine housing 2). This lever 19 extends radially outward from the rotation center of the rotatable shaft 14. The end of the lever 19 is rotated by the actuator through the rod, so that the rotatable shaft 14 is rotated.

A valve arm 20, to which the valving element 15 is attached, is provided for the inside of the rotatable shaft 14 (inside the turbine housing 2) integrally with the rotatable shaft 14. Similar to the above-described lever 19, the valve arm 20 extends radially outward from the rotation center of the rotatable shaft 14. As a result of the rotation of the rotatable shaft 14, the valving element 15, which is attached to an end of the valve arm 20 is rotated in a circular arc.

As described above, the valving element 15 is attached to the end of the valve arm 20. As a result of the rotation of the valve arm 20, the valving element 15 is rotated to open or close the flow passage switching hole 9. Specifically, the valving element 15 is a poppet valve (umbrella valve), and is attached to the valve arm 20 with a small amount of backlash permitted relative to the valve arm 20. The backlash is a clearance for absorbing an inclination of the valving element 15 relative to a valve seat surface 21 (turbine housing 2-side contact surface in contact with the valving element 15) when the valving element 15 closes the flow passage switching hole 9.

A first effect of the first embodiment will be described below. As described above, the turbocharger of the present first embodiment employs such a configuration that the movable part 16 (e.g., the rotatable shaft 14, the valving element 15, and the lever 19) of the flow passage switching valve 10 is attached to the cover 17 which is provided separately from the turbine housing 2 and that this cover 17 is press-fitted into the turbine housing 2 so as to attach the flow passage switching valve 10 to the turbocharger. Accordingly, attachment of the movable part 16 of the flow passage switching valve 10 can be easily performed, and working efficiency in attachment of the flow passage switching valve 10 can be markedly improved compared to the conventional technology.

The turbocharger of the present first embodiment produces the following effects because the cover 17 is fixed to the turbine housing 2 by press-fitting. (i) The number of components and attachment man-hours for fixing the cover 17 to the turbine housing 2 can be minimized. (ii) Processing costs for forming internal threads at the turbine housing 2 can be eliminated. (iii) A space for forming internal threads at the turbine housing 2 can be made unnecessary. (iv) Without use of a positioning pin, accuracy in attachment of the cover 17 to the turbine housing 2 can be increased, and accuracy in attachment of the rotatable shaft 14 and the valve to the flow passage switching hole 9 can be improved.

Furthermore, since the cover 17 is fixed to the turbine housing 2 by press-fitting, the turbocharger of the present first embodiment can render unnecessary a costly gasket for sealing a clearance between the turbine housing 2 and the cover 17 (see a fifth effect of the first embodiment and a second embodiment described later). Accordingly, costs of the turbocharger including the flow passage switching valve 10 can be curbed.

A second effect of the first embodiment will be described below. One direction of a flat surface including the valve seat surface 21 (surface with which the valving element 15 is engaged when the valve is closed) is hereinafter referred to as an x-axis direction. A direction of the flat surface including the valve seat surface 21, which direction is perpendicular to x-axis, is hereinafter referred to as a y-axis direction. In the present first embodiment, as illustrated in FIG. 3, a direction of press-fitting of the cover 17 into the turbine housing 2 is set parallel to the x-axis direction. The axial direction of the rotatable shaft 14 is also set parallel to the x-axis direction. In other words, when a design axial direction of the rotatable shaft 14 with respect to the turbine housing 2 is referred to as x-axis, the direction of press-fitting of the cover 17 into the turbine housing 2 is set in the x-axis direction. The valve seat surface 21 is provided parallel to x-axis and parallel to y-axis that is perpendicular to x-axis.

Accordingly, only by press-fitting the cover 17 into the turbine housing 2, the rotatable shaft 14 can be attached parallel to the valve seat surface 21. As a result, in the present first embodiment, accuracy in attachment of the flow passage switching valve 10 can be improved.

A third effect of the first embodiment will be described below. The movable part 16 of the flow passage switching valve 10 which is inserted inward of the opening 18 is horizontally long when viewed from the axial direction of the rotatable shaft 14 as illustrated in FIG. 4. Accordingly, if the opening 18 through which the horizontally long movable part 16 can be inserted is formed into a round shape, an opening area of the opening 18 becomes too large to prevent downsizing of the turbine housing 2. Moreover, a sealing distance becomes long, so that there is a concern that a leakage amount of exhaust gas may increase. In addition, there is a concern that dead volume may increase in the second exhaust scroll 8 because of the excessively large opening area of the opening 18.

Figure 4:
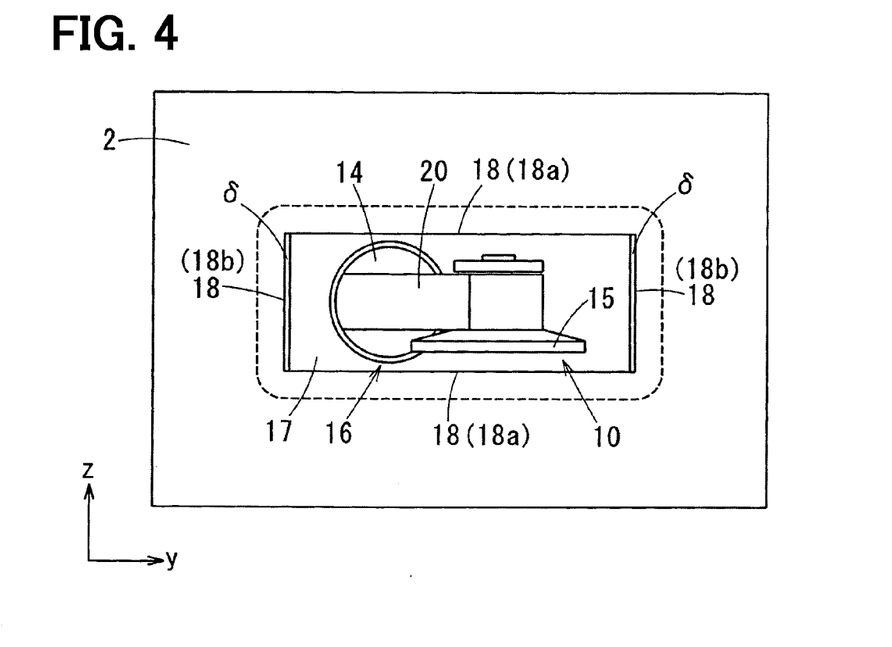
FIG. 4 is a diagram illustrating the movable part viewed from IV in FIG. 3.

For this reason, in the present first embodiment, as illustrated in FIG. 4, the opening 18 at the turbine housing 2, into which the cover 17 is press-fitted is formed into a rectangle shape through which the rotatable shaft 14 and the valving element 15 can be inserted. Accordingly, the opening area of the opening 18 can be reduced, thereby downsizing the turbine housing 2. Also, the sealing distance can be shortened to limit a leakage of exhaust gas. In addition, the dead volume in the second exhaust scroll 8 can be reduced, and improvement in turbine efficiency can be expected.

A fourth effect of the first embodiment will be described below. In the present first embodiment, press-fitting sides 18*a* of the opening 18 having a rectangle shape, into which press-fitting sides 18*a* the cover 17 is press-fitted, are opposed two sides (longer sides in the present first embodiment). These two sides (press-fitting sides 18*a*) are provided parallel to y-axis as illustrated in FIG. 4. By so providing, a distance of the "shaft center of the rotatable shaft 14" relative to the "valve seat surface 21" can be correctly set. Thus, when a direction perpendicular to the valve seat surface 21 (direction perpendicular to both x-axis and y-axis) is referred to as a z-axis direction, accuracy in attachment of the rotatable shaft 14 in the z-axis direction can be improved.

As illustrated in FIG. 4, small clearances δ are formed between two sides of the opening 18 having a rectangle shape into which the cover 17 is not press-fitted (non-press-fitting sides 18*b*: shorter sides in the present first embodiment) and the cover 17. The shaft center of the rotatable shaft 14 may be shifted in the y-axis direction due to the clearances δ. Nevertheless, even if the shaft center of the rotatable shaft 14 is shifted in the y-axis direction, the engagement between the valving element 15 and the valve seat surface 21 is maintained when the valve is closed. Therefore, even though the attachment error is absorbed in the y-axis direction does not cause a valve leakage or the like.

A fifth effect of the first embodiment will be described below. In the present first embodiment, as illustrated in FIG. 3, the opening 18 is closed by a stepped surface 17*a* of the cover 17. Specifically, the stepped surface 17*a* which is formed at the cover 17 to close the opening 18 is provided in a flat surface perpendicular to x-axis. Similarly, a surface on the turbine housing 2-side with which the stepped surface 17*a* of the cover 17 is in contact is also provided in a flat surface perpendicular to x-axis.

Accordingly, when the cover 17 is press-fitted into the turbine housing 2, by closely-attaching the stepped surface 17*a* of the cover 17 on the turbine housing 2, the opening 18 (specifically, the above-described clearances δ) can be sealed with the stepped surface 17*a*, and a leakage of exhaust gas can thus be prevented without use of an expensive gasket.

Furthermore, by closely-attaching the stepped surface 17*a* on the turbine housing 2 when the cover 17 is press-fitted, the valving element 15 is positioned in the x-axis direction relative to the turbine housing 2 (specifically, the flow passage switching hole 9). Thus, accuracy in attachment of the valving element 15 to the turbine housing 2 (flow passage switching hole 9) can be improved.

Second Embodiment

Figure 5:
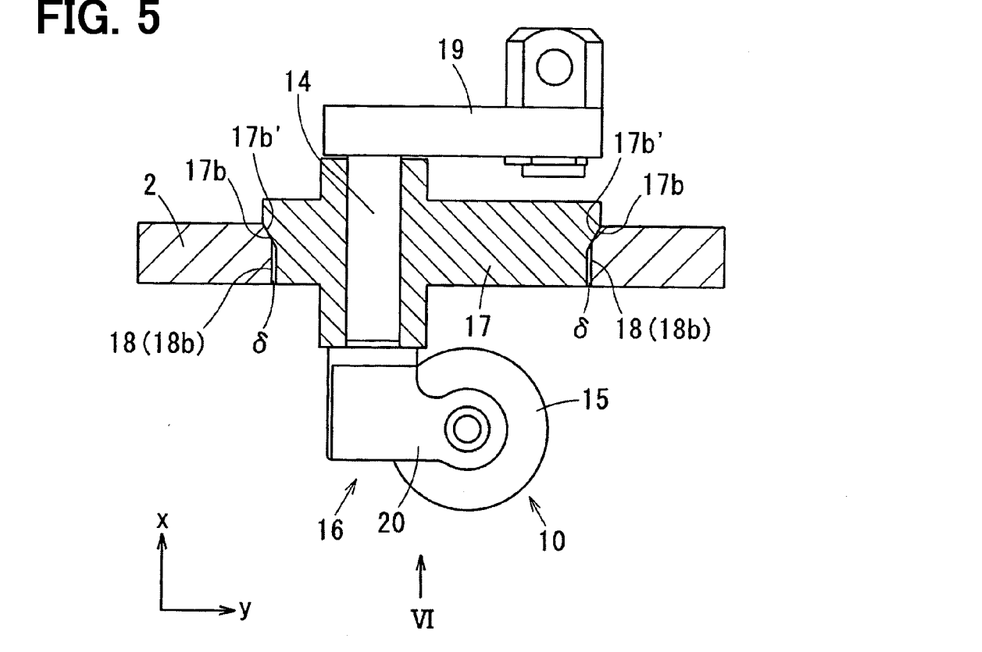
FIG. 5 is a diagram illustrating a movable part of a flow passage switching valve attached to a turbine housing via a cover in accordance with a second embodiment.
Figure 6:
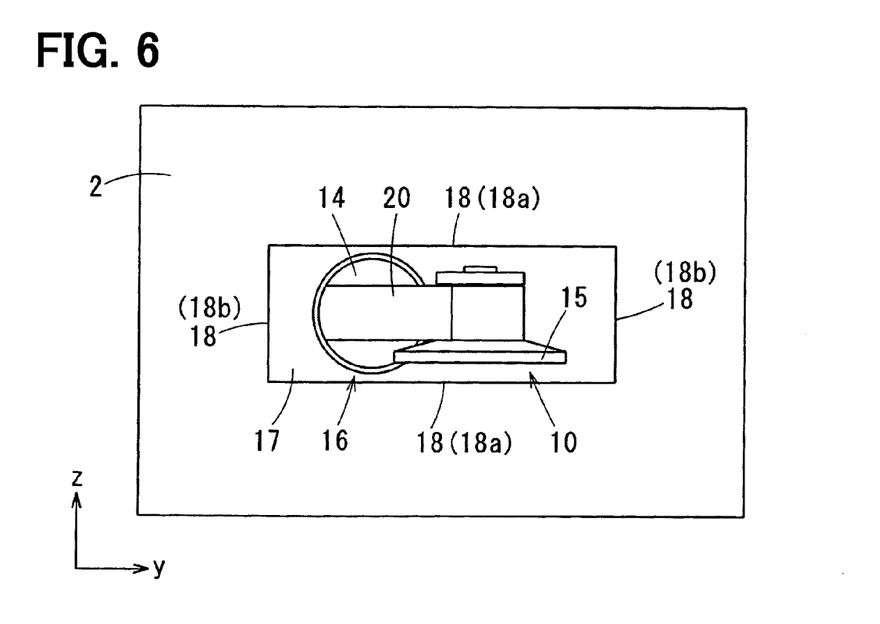
FIG. 6 is a diagram illustrating the movable part viewed from VI in FIG. 5.

A second embodiment will be described with reference to FIGS. 5 and 6. In the following embodiment, the same reference numerals as in the above first embodiment indicate their corresponding functional objects. In the present second embodiment, clearances between non-press-fitting sides 18*b* (shorter sides) of an opening 18 in a rectangle shape, into which a cover 17 is not press-fitted, and the cover 17 are closed by a tapered surface 17*b* which is provided for the cover 17 as illustrated in FIGS. 5 and 6.

Specifically, in the present second embodiment, similar to the above first embodiment, press-fitting sides 18*a* of the opening 18 in a rectangle shape, into which the cover 17 is press-fitted, are opposed two sides (longer sides). On the other hand, the two sides (shorter sides) of the opening 18 in a rectangle shape, into which the cover 17 is not press-fitted, are the non-press-fitting sides 18*b*.

At the cover 17 of the present second embodiment, there is provided the tapered surfaces 17*b* which are closely-attached respectively to the two non-press-fitting sides 18*b* to close the clearances between the non-press-fitting sides 18*b* and the cover 17. In the present second embodiment, a taper receiving surface 17*b*' corresponding to the tapered surface 17*b* is also formed at the non-press-fitting side 18*b* that receives the tapered surface 17*b*.

Accordingly, when the cover 17 is press-fitted into a turbine housing 2, the two tapered surfaces 17*b* of the cover 17 are closely-attached respectively to the two non-press-fitting sides 18*b* of the opening 18 opposed to each other (specifically, the tapered surfaces 17*b* are closely-attached on the taper receiving surfaces 17*b*') so that the clearances δ described in the above first embodiment can be closed, and a leakage of exhaust gas can thus be prevented without use of an expensive gasket.

Additionally, when the cover 17 is press-fitted, by closely-attaching the two tapered surfaces 17*b* respectively to the two non-press-fitting sides 18*b*, a valving element 15 is positioned in an x-axis direction and a y-axis direction relative to the turbine housing 2 (specifically, a flow passage switching hole 9). Thus, accuracy in attachment of the valving element 15 to the turbine housing 2 (flow passage switching hole 9) can be improved more than the first embodiment.

To sum up, the turbocharger of the above embodiments can be described as follows.

According to the turbocharger of the embodiments, the movable part 16 (e.g., the rotatable shaft 14 and the valving element 15) of the flow passage switching valve 10 is attached to the cover 17 which is provided separately from the turbine housing 2, and then the cover 17 is press-fitted into the turbine housing 2. As a result, the flow passage switching valve 10 is attached to the turbocharger. Thus, attachment of the movable part 16 is excellent, and working efficiency in attachment of the flow passage switching valve 10 can be improved. Moreover, because the cover 17 is fixed to the turbine housing 2 by press-fitting, (i) the number of components and attachment man-hours for fixing the cover 17 to the turbine housing 2 can be minimized; (ii) processing costs for forming internal threads at the turbine housing 2 can be eliminated; (iii) a space for forming internal threads at the turbine housing 2 can be made unnecessary; and (iv) without use of a positioning pin, accuracy in attachment of the cover 17 to the turbine housing 2 can be increased, and accuracy in attachment of the rotatable shaft 14 and the valve to the flow passage switching hole 9 can be improved. Furthermore, since the cover 17 is fixed to the turbine housing 2 by press-fitting, a costly gasket for sealing a clearance between the turbine housing 2 and the cover 17 can be rendered unnecessary and costs of the turbocharger can thus be curbed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A turbocharger for an engine, comprising:
   a compressor impeller for compression of intake air;
   a turbine wheel that drives the compressor impeller;
   a turbine housing that includes:
      first and second exhaust scrolls independently of each other, wherein the first and second exhaust scrolls swirl exhaust gas which is discharged from the engine and blow the swirled exhaust gas toward the turbine wheel; and
      a flow passage switching hole that guides exhaust gas into the second exhaust scroll;
   a cover that is provided separately from the turbine housing; and
   a flow passage switching valve that opens or closes the flow passage switching hole and includes a movable part having a rotatable shaft and a valving element, wherein:
   the movable part is attached to the cover; and
   the flow passage switching valve is attached in the turbine housing with the cover press-fitted to the turbine housing;
   the turbine housing further includes an opening into which the cover is press-fitted, and the opening is formed in a rectangle shape;
   the opening having the rectangle shape includes press-fitting sides into which the cover is press-fitted, and the press-fitting sides are opposed two sides of the rectangle shape; and
   the opening having the rectangle shape further includes a non-press-fitting side into which the cover is not press-fitted, and a clearance is formed between the non-press-fitting side and the cover.

2. The turbocharger according to claim 1, wherein:
   the turbine housing further includes a valve seat surface which is a contact surface that is in contact with the valving element when the valving element closes the flow passage switching hole;
   a direction of a flat surface including the valve seat surface is an x-axis direction;
   a direction of the flat surface that is perpendicular to the x-axis direction is a y-axis direction;
   a direction in which the cover is press-fitted to the turbine housing is parallel to the x-axis direction; and
   an axial direction of the rotatable shaft is also set parallel to the x-axis direction.

3. The turbocharger according to claim 2, wherein:
   the rotatable shaft and the valving element are insertable into the opening formed in the rectangular shape.

4. The turbocharger according to claim 3, wherein:
   the two sides are provided parallel to the y-axis direction.

5. The turbocharger according to claim 4, wherein the opening is closed by a stepped surface that is provided for the cover.

6. The turbocharger according to claim 4, wherein:
   the clearance is closed by a tapered surface that is provided for the cover.

7. A turbocharger for an engine, comprising:
   a compressor impeller for compression of intake air;
   a turbine wheel that drives the compressor impeller;
   a turbine housing that includes:
      first and second exhaust scrolls independently of each other, wherein the first and second exhaust scrolls swirl exhaust gas which is discharged from the engine and blow the swirled exhaust gas toward the turbine wheel; and
      a flow passage switching hole that guides exhaust gas into the second exhaust scroll;
   a cover that is provided separately from the turbine housing; and
   a flow passage switching valve that opens or closes the flow passage switching hole and includes a movable part having a rotatable shaft and a valving element, wherein:
   the movable part is attached to the cover;
   the cover is press-fitted to the turbine housing, so that the flow passage switching valve is attached to the turbocharger;
   the turbine housing further includes a valve seat surface which is a contact surface that is in contact with the valving element when the valving element closes the flow passage switching hole;
   a direction of a flat surface including the valve seat surface is an x-axis direction;
   a direction of the flat surface that is perpendicular to the x-axis direction is a y-axis direction;
   a direction in which the cover is press-fitted to the turbine housing is parallel to the x-axis direction;
   an axial direction of the rotatable shaft is also set parallel to the x-axis direction;
   the turbine housing further includes an opening into which the cover is press-fitted;
   the opening is formed in a rectangle shape into which the rotatable shaft and the valving element are insertable;
   the opening having the rectangle shape includes press-fitting sides into which the cover is press-fitted;
   the press-fitting sides are opposed two sides of the rectangle shape;
   the two sides are provided parallel to the y-axis direction;
   the opening having the rectangle shape further includes a non-press-fitting side into which the cover is not press-fitted; and
   a clearance between the non-press-fitting side and the cover is closed by a tapered surface that is provided for the cover.

* * * * *